United States Patent
Harris

(10) Patent No.: US 6,199,574 B1
(45) Date of Patent: Mar. 13, 2001

(54) ELECTRONIC FILL LIMIT CONTROL

(75) Inventor: Robert S. Harris, Connersville, IN (US)

(73) Assignee: Stant Manufacturing Inc., Connersville, IN (US)

(*) Notice: Subject to any disclaimer, the term of this patent is extended or adjusted under 35 U.S.C. 154(b) by 0 days.

(21) Appl. No.: 09/509,352
(22) PCT Filed: Oct. 2, 1998
(86) PCT No.: PCT/US98/20735
§ 371 Date: Jun. 12, 2000
§ 102(e) Date: Jun. 12, 2000
(87) PCT Pub. No.: WO99/18379
PCT Pub. Date: Apr. 15, 1999

Related U.S. Application Data
(60) Provisional application No. 60/060,662, filed on Oct. 2, 1997.

(51) Int. Cl.$^7$ .................................................. F16K 24/04
(52) U.S. Cl. .............................................. 137/199; 137/43
(58) Field of Search ....................................... 137/43, 199

(56) References Cited

U.S. PATENT DOCUMENTS

| | | |
|---|---|---|
| 3,586,015 | 6/1971 | Kitzner . |
| 3,586,016 | 6/1971 | Meyn . |
| 4,724,705 | 2/1988 | Harris . |
| 4,790,349 | 12/1988 | Harris . |
| 5,065,782 | 11/1991 | Szlaga . |
| 5,116,257 | 5/1992 | Szlaga . |
| 5,535,772 | 7/1996 | Roetker et al. . |
| 6,047,720 | * 4/2000 | Stein ..................................... 137/199 |

FOREIGN PATENT DOCUMENTS

| | | |
|---|---|---|
| 58-163877 | 9/1983 | (JP) . |
| WO 97/05415 | * 2/1997 | (WO) ................................... 137/199 |

* cited by examiner

Primary Examiner—Gerald A. Michalsky
(74) Attorney, Agent, or Firm—Barnes & Thornburg

(57) ABSTRACT

An apparatus for controlling the discharge of fuel vapor and liquid fuel through an aperture formed in a fuel tank, comprising a housing adapted to be mounted in an aperture formed in a fuel tank and being formed to include a venting outlet, a valve positioned to lie in the housing and move between an opened position allowing flow of fuel vapor through the venting outlet formed in the housing and a closed position preventing flow of fuel vapor and liquid fuel through the venting outlet, and a valve actuator including a fluid actuator valve mover in the housing and an electronic liquid detector coupled to the valve mover, arranged to move the valve between the closed position and the opened position, the electronic liquid detector including a valve mover controller coupled to the valve mover to control fluid at said fluid actuated valve mover and an electronic liquid sensor coupled to the valve mover controller and positioned to lie in a fixed position relative to the housing to sense the presence of liquid fuel at a predetermined position, the valve mover controller being configured to instruct the valve mover to move the valve to the closed position in response to sensing of liquid fuel at the predetermined position by the electronic liquid sensor.

21 Claims, 9 Drawing Sheets

ELECTRONIC FILL LIMIT CONTROL

This application is the National Stage of PCT Application No. PCT/US98/20735 filed Oct. 2, 1998 which claims priority from U.S. Provisional application Serial No. 60/060,662 filed Oct. 2, 1997.

BACKGROUND AND SUMMARY OF THE INVENTION

The present invention relates to tank pressure control systems and particularly to an apparatus for controlling flow of fuel vapor and liquid fuel through an aperture in a fuel tank. More particularly, the present invention relates to a fill-limit valve system for controlling tank ventilation and for preventing overfilling of a vehicle fuel tank.

Fuel-dispensing pump nozzles are known to include a fill-limiting sensor for shutting of the flow of fuel from the nozzle when a vehicle fuel tank is nearly filled. Typically, this fill-limiting sensor is triggered whenever the fuel tank is full and fuel "backs up" the tank filler neck to splash onto or reach the fill-limiting sensor located on the nozzle. Sometimes fuel pump operators overfill a fuel tank inadvertently in a good-faith effort to fill the tank "completely" or to purchase a quantity of fuel that can be paid for in cash without causing the operator to receive unwanted coinage in change.

It has been observed that fuel pump operators are able to manually override or bypass some fill-limiting sensors on nozzles by continuing to pump fuel after the pump nozzle has automatically shut off several times. This practice has come to be called the "trickle-fill" method of introducing liquid fuel into a fuel tank. Using this well-known trickle-fill method, the fuel pump operator "clicks" or squeezes the lever handle on the pump nozzle slowly two or three times in succession after automatic nozzle shut-off has occurred in order to introduce more fuel into the fuel tank without actuating the fill-limiting sensor right away. It will be appreciated that such trickle-fill practices can result in overfilling the fuel tank which can effectively reduce the fuel vapor expansion capacity in the vapor space available within the filled fuel tank.

During cornering, the liquid fuel inside a vehicle fuel tank is often agitated to cause the liquid fuel to move with a splashing motion inside the vehicle fuel tank. Liquid fuel can also be sloshed about in a vehicle fuel tank in response to other types of vehicle motion in addition to vehicle cornering.

Vehicle fuel tanks include vent apparatus for regulating discharge of liquid fuel and fuel vapor from the interior region of the fuel tank. Such a vent apparatus is often mounted in an aperture formed in a top wall of the vehicle fuel tank and could be exposed to rising levels of liquid fuel in the fuel tank during refueling and/or to agitated liquid fuel that is sloshed about inside the vehicle fuel tank during cornering or other movement of the vehicle. This type of vent apparatus often includes a buoyant "float valve" that is movable in a fuel tank to open and close a fuel tank venting outlet and that is capable of floating in liquid fuel once the liquid fuel rises to a certain level in the fuel tank. During tank refueling and sometimes during fuel sloshing, float valves are moved by liquid fuel to close tank venting outlets.

According to the present invention, an apparatus is provided for controlling the discharge of fuel vapor and liquid fuel through an aperture in a fuel tank. The apparatus includes a housing formed to include a venting outlet, a vent valve positioned to lie in the housing, and a valve actuator coupled to the vent valve. The vent valve moves between an opened position allowing flow of fuel vapor in the tank through the venting outlet formed in the housing and a closed position preventing flow of fuel vapor and liquid fuel in the tank through the venting outlet. The valve actuator includes an electronic liquid detector and is operable to move the vent valve to the closed position upon detection of liquid fuel that has been communicated to the valve actuator due to, for example, filling the tank to its fill limit with liquid fuel and/or sloshing of liquid fuel inside the tank.

In preferred embodiments, the valve actuator includes a vent valve mover and the electronic liquid detector is coupled to the vent valve mover. The vent valve mover is positioned to lie in the housing and arranged to move the vent valve between the opened and closed positions. The electronic liquid detector includes a valve mover controller coupled to the vent valve mover and an electronic sensor coupled to the valve mover controller. The electronic sensor senses the presence of liquid fuel at a predetermined region or position in the fuel tank (e.g., in the lower region of an open bottom portion of the housing exposed to fuel vapor and liquid fuel in the interior region of the fuel tank). When the electronic sensor senses liquid fuel at the predetermined position, the valve mover controller instructs the valve mover to move the valve to the closed position. The electronic sensor is preferably either a capacitance sensor or an optical sensor and the valve mover controller preferably includes a solenoid.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
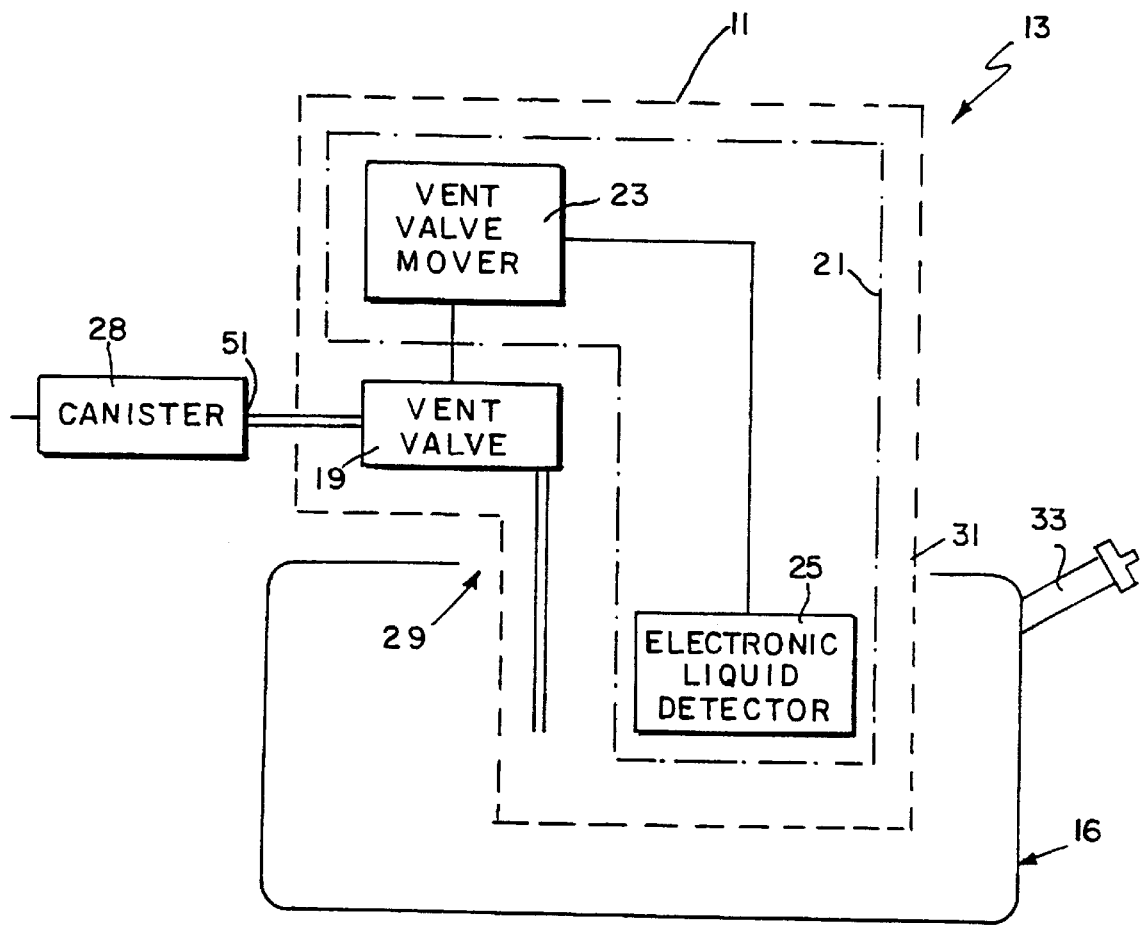
FIG. 1 is a diagrammatic view of a tank venting system in accordance with the present invention showing a fuel tank formed to include an interior region and a filler neck for conducting liquid fuel into the interior region, a vent apparatus for controlling the discharge of fuel vapor and liquid fuel from the interior region of the fuel tank through an aperture formed in a top wall of the fuel tank, and a fuel vapor treatment canister coupled to the vent apparatus, the vent apparatus including a vent valve, a vent valve mover, and an electronic liquid detector positioned to lie in the fuel tank and configured to control operation of the vent valve mover so as to move the vent valve between the opened and closed positions.

A diagrammatic representation of a fuel tank venting control apparatus 11 for a fuel system 13 is illustrated in FIG. 1. Apparatus 11 operates to control discharge of fuel vapor 14 and liquid fuel 30 from a fuel tank 16 using a fuel vapor vent valve 19 and a valve actuator 21 including a valve mover 23 and an electronic liquid detector 25.

A first embodiment of an apparatus 10 is shown in FIGS. 2–9. Apparatus 10 includes a flow path 26 through which pressurized fuel vapor 14 can escape from fuel tank 16 to a fuel vapor treatment canister 28. Vent valve 18 is moved to close flow path 26 when retention of fuel vapor 14 in fuel tank 16 is desired and to open flow path 26 when venting of fuel vapor 14 from fuel tank 16 is desired. The pressure of fuel vapor 14 and the positioning of liquid fuel 30 at a predetermined position in fuel tank 16 control the movement of vent valve 18 between opened and closed positions.

Figure 4:
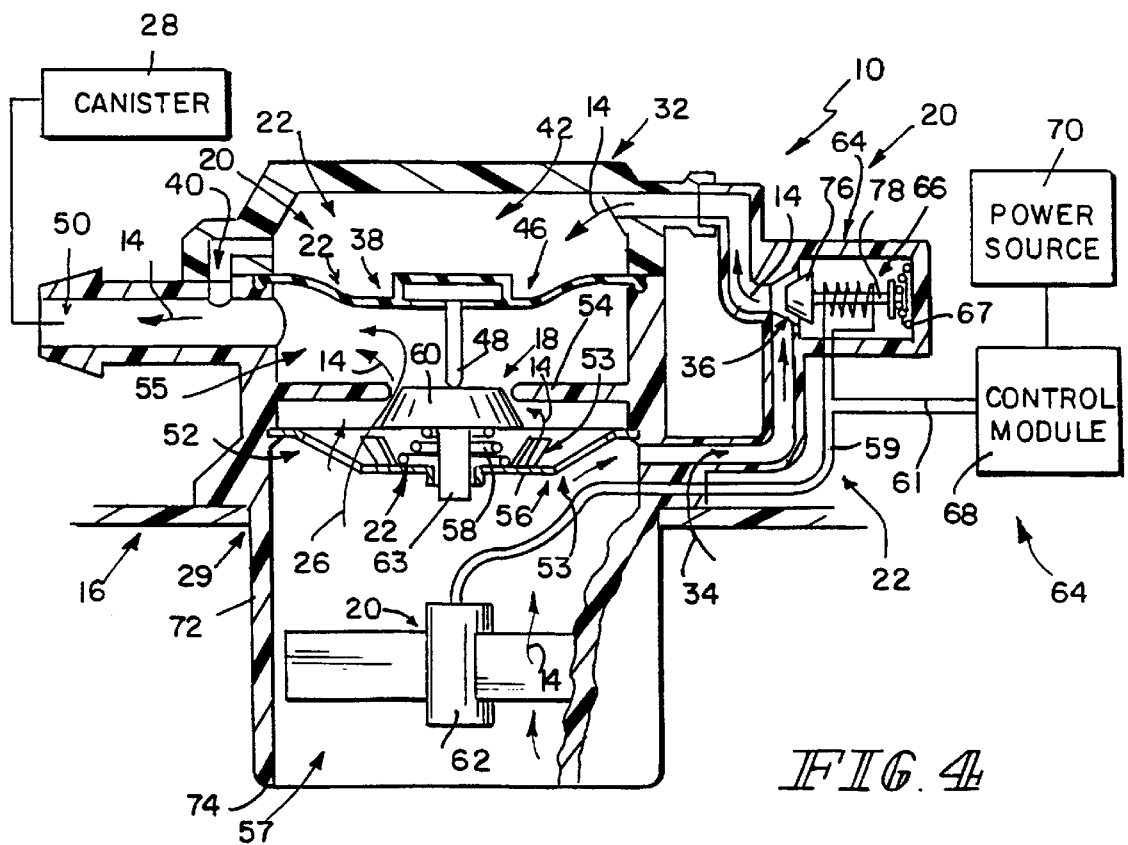
FIG. 4 is a side elevation view of the vent apparatus of FIG. 3, with portions broken away, showing a housing mounted in an aperture formed in the fuel tank, a vent valve, and a valve actuator coupled to the housing and arranged to move the valve to the opened position so that pressurized fuel vapor in the fuel tank vents to the canister, the valve actuator including a diaphragm, a drive stem coupled to the diaphragm, a bypass passage formed in the housing to conduct pressurized fuel vapor into a venting control chamber above the diaphragm and move the diaphragm and drive stem downwardly to move the vent valve to the tank-venting opened position, a liquid fuel sensor positioned in a lower region of the housing, and a shut-off valve movable in the housing to open and close the bypass passage, the sensor senses the presence of liquid fuel (e.g., rising or sloshing liquid fuel) at a predetermined position in the fuel tank, and pressurized fuel vapor passes from the tank to the venting control chamber (past the opened shut-off valve) and acts against an upper side of the diaphragm to move the drive stem downwardly to urge the vent valve against a spring to an opened position in response to the sensor sensing liquid fuel at the predetermined position in the fuel tank.

As shown in FIG. 4, tank venting control apparatus 10 includes a housing 32 mounted in an aperture formed in a top wall of fuel tank 16 having a filler neck 33. Valve mover 22 includes a passage 34 formed in housing 32, a differential pressure actuator 38, a bleed aperture 40, and a venting control chamber 42 defined by housing 32 and differential pressure actuator 38. Electronic liquid detector 24 includes a shut-off valve 36 positioned to lie in passage 34.

Figure 3:
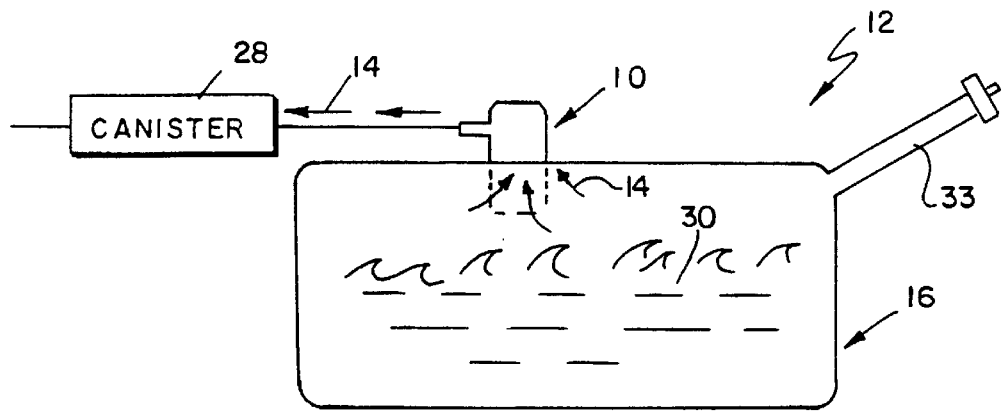
FIG. 3 is a diagrammatic view of the tank venting system of FIG. 2 during normal operation of a vehicle containing the fuel tank and showing liquid fuel sloshing in the fuel tank and fuel vapor flowing from the fuel tank through the vent apparatus to the canister.

In operation of apparatus 10 during operation of the vehicle (as shown in FIG. 3), shut-off valve 36 moves in response to decreasing liquid fuel levels to an open position allowing fuel vapor 14 to flow from fuel tank 16 through passageway 34 to reach differential pressure actuator 38 as shown in FIG. 4. Actuator 38 includes a diaphragm 46 and a drive stem 48 coupled to diaphragm 46. When the fuel vapor pressure acting against differential pressure actuator 38 reaches a predetermined level, diaphragm 46 moves stem 48 to move vent valve 18 to the opened position allowing flow of fuel vapor 14 through flow path 26 from fuel tank 16. From flow path 26, fuel vapor 14 can pass at a predetermined rate to canister 28 through a venting outlet 50 formed in housing 32.

Figure 5:
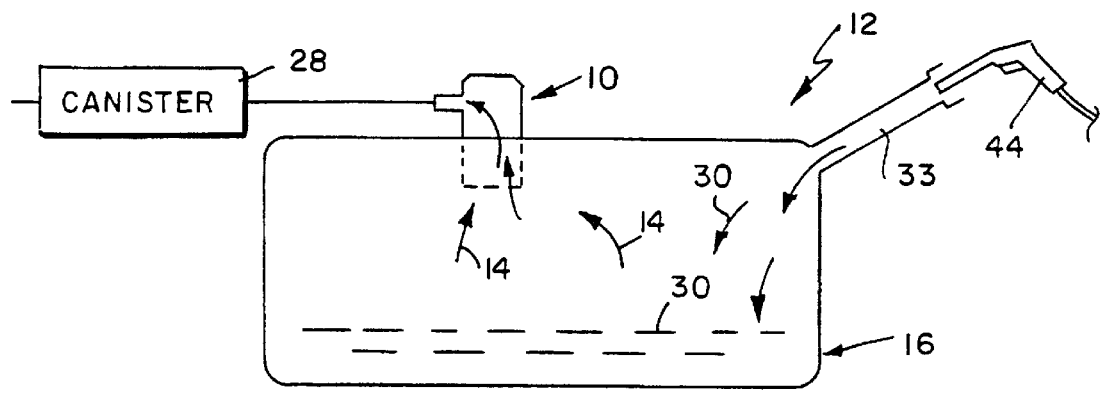
FIG. 5 is a diagrammatic view similar to FIG. 3 showing pressurized fuel vapor flowing from the fuel tank through the vent apparatus to the canister as liquid fuel is being pumped into the fuel tank during tank refueling.
Figure 6:
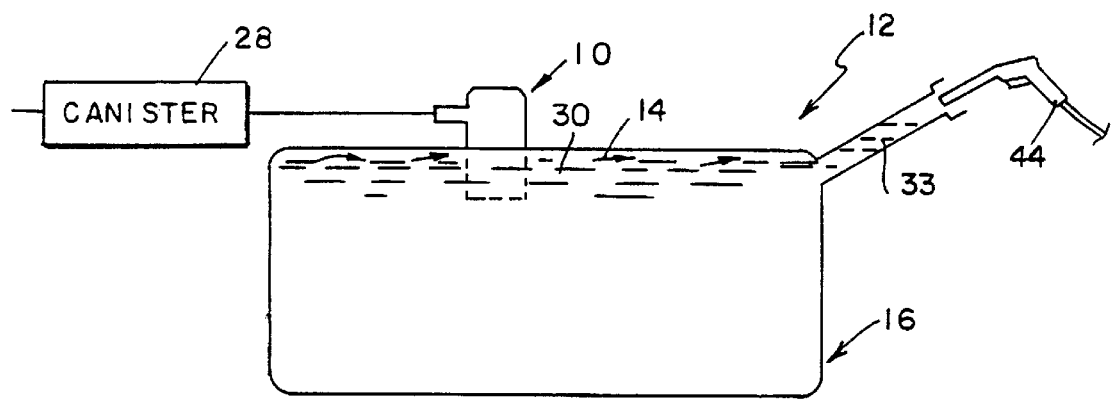
FIG. 6 is a diagrammatic view similar to FIG. 3 showing exposure of the vent apparatus to liquid fuel once the tank has been filled to a predetermined level during fuel vapor refueling and cessation of discharge of pressurized fuel vapor through the vent apparatus to the canister.
Figure 7:
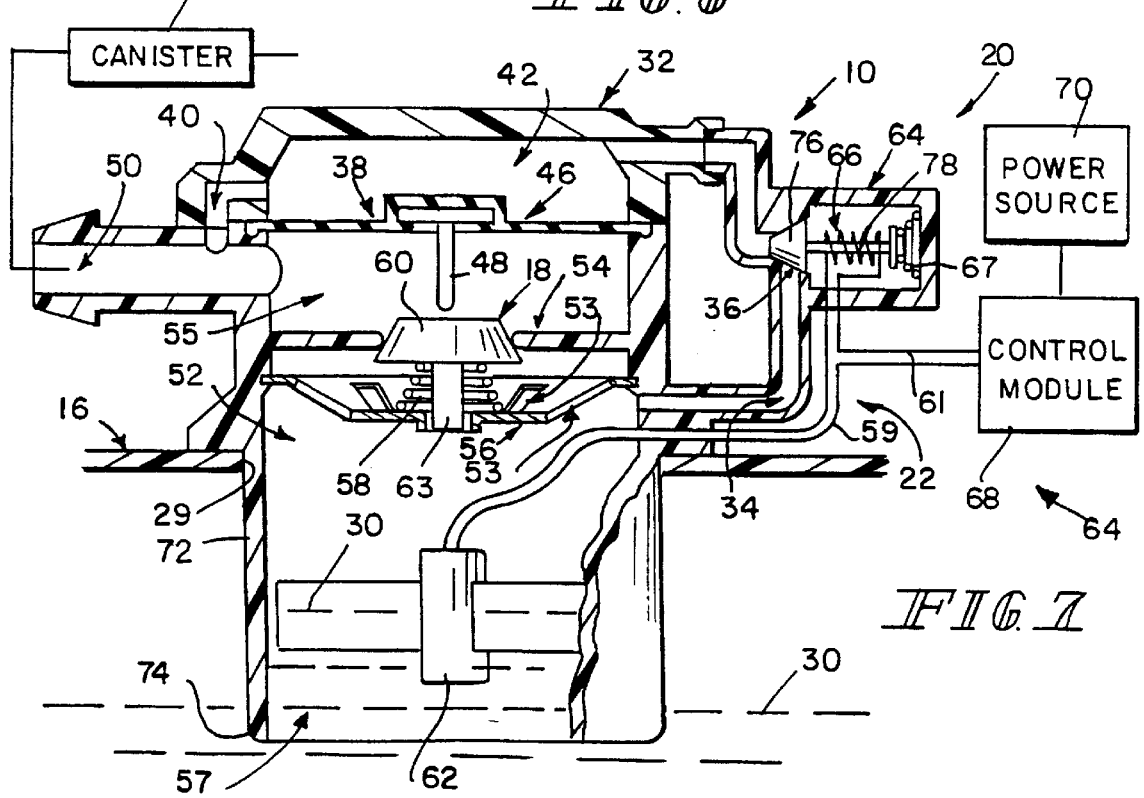
FIG. 7 is a view of the vent apparatus of FIG. 3 in the environment shown in FIG. 5 showing the vent valve of the vent apparatus in a closed position so that no fuel vapor or liquid fuel flows through the vent apparatus, the shut-off valve being in a closed position blocking flow of pressurized fuel vapor from the tank to the venting control chamber through the bypass passage in response to the liquid sensor sensing liquid fuel at a predetermined position in the housing.

In operation of apparatus 10 during refueling of the vehicle (as shown in FIGS. 5 and 6), fuel vapor 14 is prevented from entering passage 34 by shut-off valve 36, which moves to the closed position in response to the accumulation of liquid fuel 30 in fuel tank 16 at the predetermined position as shown in FIG. 7. With passage 34 closed, differential pressure actuator 38 is isolated from exposure to fuel vapor 14 and any positive pressure in venting control chamber 42 bleeds through bleed aperture 40. Diaphragm 46 moves away from vent valve 18 and drive stem 48 moves out of engagement with vent valve 18. Thus, vent valve 18 moves to the closed position preventing fuel vapor 14 from flowing through flow path 26. Thus, fuel vapor 14 collects in fuel tank 16. As additional liquid fuel 30 is added to fuel tank 16, the pressure exerted by this collected fuel vapor 14 eventually becomes sufficient to displace liquid fuel 30 in reverse flow up filler neck 33 to actuate a shut-off mechanism provided on fuel filler nozzle 44 as shown in FIG. 6.

As shown in FIG. 4, housing 32 is formed to include a valve chamber 52 sized to receive vent valve 18 for movement therein, a valve seat 54 that cooperates with vent valve 18 to close flow path 26, a flow chamber 55 defined by diaphragm 46 and valve seat 54 and formed to include vent apertures 53, a spring mount 56 positioned to lie below valve seat 54, and an inlet 57 positioned to lie below spring mount 56. Valve mover 22 further includes a spring 58 positioned to lie between spring mount 56 and vent valve 18 to bias and move vent valve 18 against valve seat 54.

Vent valve 18 is provided with a valve member 60 and a guide stem 62. Valve seat 54 is sized to receive valve member 60 in sealing engagement therewith to close the flow of fuel vapor 14 from fuel tank 16 to venting outlet 50. Thus, fuel vapor 14 from fuel tank 16 entering valve chamber 52 by way of inlet 57 formed in housing 36 is prevented from entering venting outlet 50 and is thus prevented from entering flow chamber 55.

Figure 2:
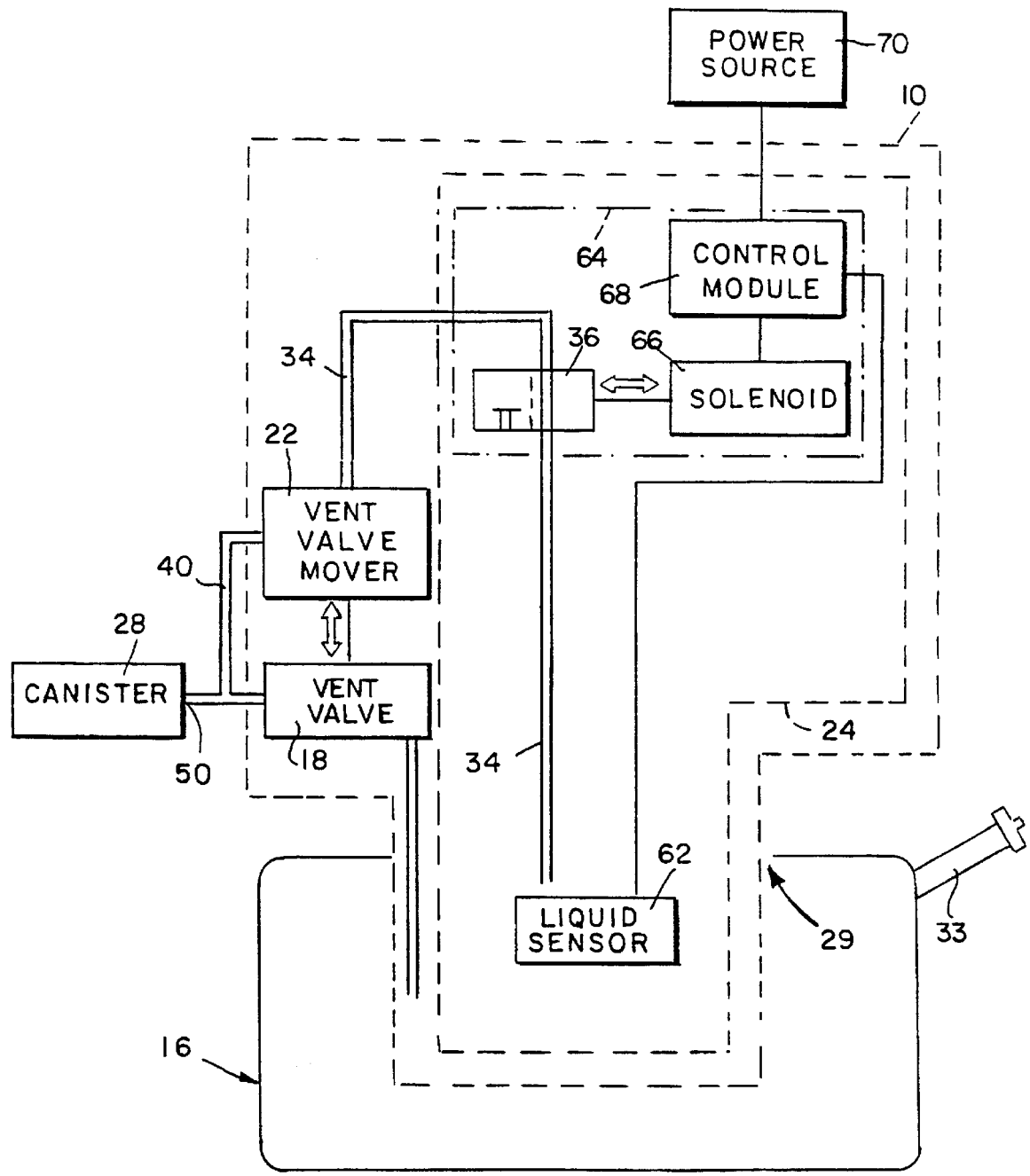
FIG. 2 is a diagrammatic view of a first embodiment of a tank venting system in accordance with the present invention showing the fuel tank, a vent apparatus for controlling the discharge of fuel vapor and liquid fuel through the aperture formed in the top wall of the fuel tank, and the fuel vapor treatment canister coupled to the vent apparatus, the vent apparatus including a vent valve, a vent valve mover, and a liquid fuel sensor positioned to lie in the fuel tank and configured to operate a control module, solenoid, and shut-off valve to control operation of the vent valve mover so as to move the vent valve between the opened and closed positions.

As shown in FIG. 2, electronic liquid detector 24 includes an electronic sensor 62 and a valve mover controller 64 including shut-off valve 36, an electronic actuator such as solenoid 66 including a spring 67, and a control module 68 coupled to a power source 70. Housing 32 further includes a cylindrical wall 72 including a bottom lip 74 defining inlet 57. Electronic sensor 62 is coupled to cylindrical wall 72 as shown in FIG. 4.

Shut-off valve 36 includes a valve member 76 and a core stem 78 positioned to lie in solenoid 66 and biased by spring 67. Core stem 78 functions as a solenoid core and is moved by solenoid 66 to an activated position as shown in FIG. 4 and spring 67 moves core stem 78 to a deactivate position as shown in FIG. 7. Thus, valve member 76 opens passage 34 while stem 78 is in the activated position and closes passage 34 while core stem 78 is in the deactivated position.

Electronic sensor 62 is positioned to lie at the predetermined position in fuel tank 16 to sense for the presence of liquid fuel 30. Upon sensing liquid fuel 30, electronic sensor 62 communicates the sensation to control module 68 by an electrical signal. Based on logic hardwired or programmed into control module 68, control module 68 deactivates solenoid 66 and core stem 78 moves to the deactivated position to close passageway 34. This closure cause differential pressure diaphragm 38 to close vent valve 18 as previously discussed.

Electronic sensor 62 will detect liquid fuel 30 at the predetermined position in fuel tank 16 when liquid fuel 30 enters cylindrical wall 72 as shown in FIG. 7. Liquid fuel 30 will enter cylindrical wall 72 during when liquid fuel 30 sloshes in fuel tank 16 during vehicle operation. Thus, upon detection of liquid fuel 30 at the predetermined position, electronic liquid detector 24 instructs valve mover 22 to quickly close vent valve 18. This closure preserves the desired level of fuel vapor 14 in fuel tank 16 during refueling and prevents liquid fuel from entering flow chamber 55 during sloshing.

Control module 68 can also be hardwired or programmed to instruct the closure of vent valve 18 during other environmental conditions. For example, control module 68 may include an orientation sensor that detects the orientation of the vehicle relative to the ground. Thus, in the event of a vehicle rollover or significant tilting of a vehicle with respect to the horizontal, the control module can be hardwired or preprogrammed to instruct the closure of vent valve 18 when the vehicle reaches a predetermined orientation. Likewise, the control module 68 may include an emissions recorder that detects and records emissions data. Thus, in the event that the emissions data reaches a predetermined level or condition, control module 68 can instruct the closure of vent valve 18.

Control module 68 can also be hardwired or programmed to record the number of changes of position of shut-off valve 36 to limit the changes in position of shut-off valve 36 to a predetermined number and semi-permanently close shut-off valve 36. This semi-permanent closure would stop the flow of fluel vapor 14 through apparatus 10 and prevent fuel filler nozzle 44 for shooting additional liquid fuel 30 into filler neck 32. For example, control module 68 could be configured to limit the number of changes in position of shut-off valve 36 to six. Thus, a vehicle refueller would be limited to six "clicks" of fuel filler nozzle 44 and no additional fuel 30 could be shot into filler neck 32. Control module 68 could also be configured to "reset" and instruct shut-off valve 36 to reopen after a predetermined time or a predetermined condition such as engine start.

Figure 8:
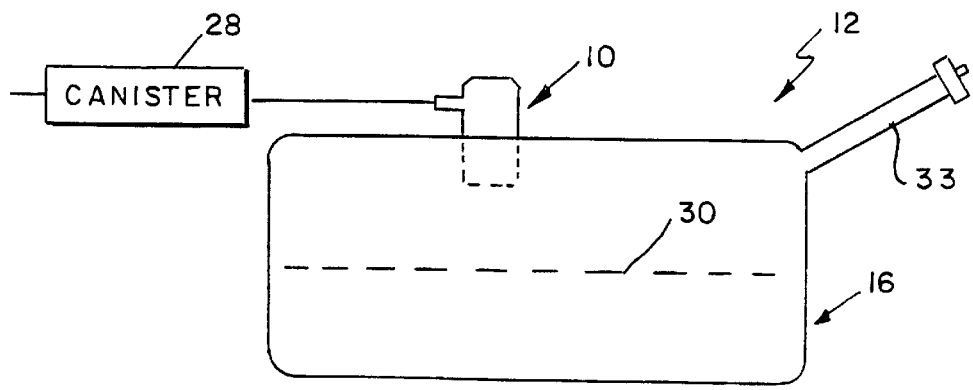
FIG. 8 is a diagrammatic view similar to FIG. 3 showing a moderate amount of liquid fuel in the fuel tank at nominal tank pressure so that no fuel vapor is flowing from the fuel tank through the vent apparatus to the canister.
Figure 9:
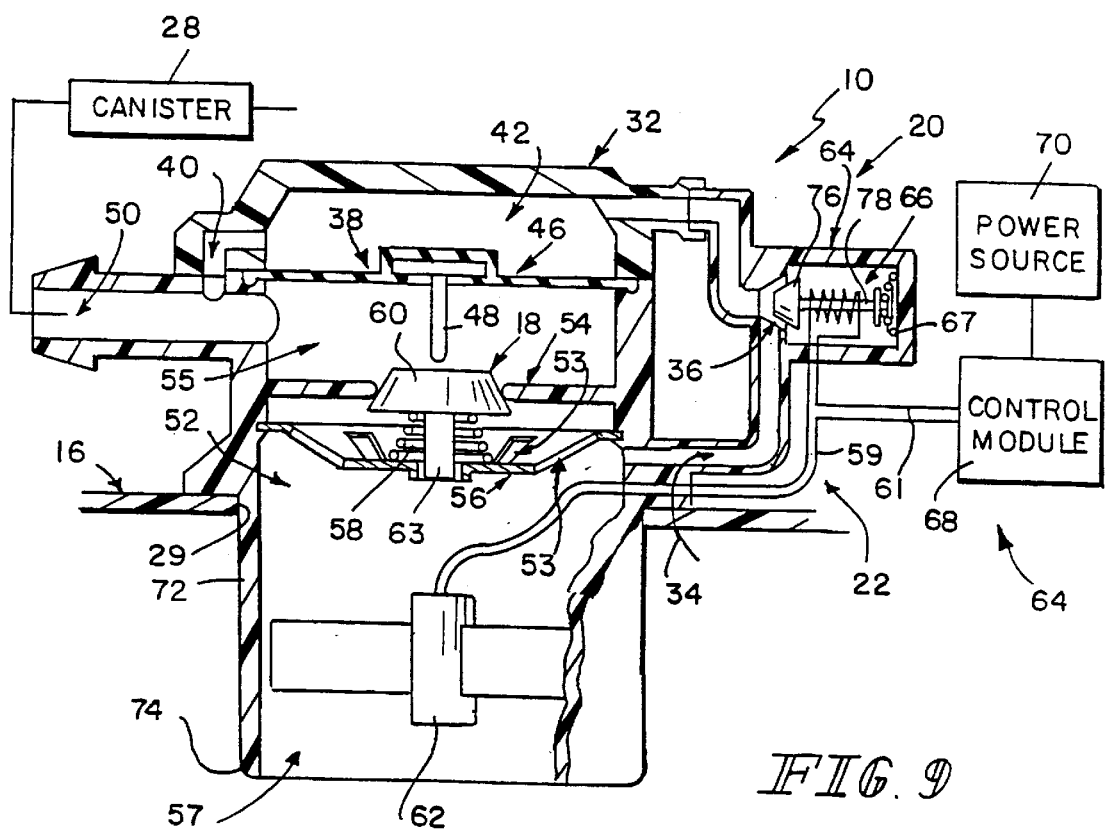
FIG. 9 is a view of the vent apparatus of FIG. 3 in the environment of FIG. 8 showing the shut-off valve being in the opened position, the fuel vapor at low pressure and the drive stem moved away from the vent valve to allow the biasing spring to move the vent valve to the closed position so that no fuel vapor flows from the fuel tank through the venting outlet of the housing.

Apparatus 10 is shown in a low-pressure condition in FIGS. 8 and 9. The low-pressure conditions exist when the temperature is cool (for example, below 70 degrees Fahrenheit). When in the low-pressure condition, vent valve 18 will be biased in the closed position by spring 58 because too little pressure is present in venting control chamber 42 to move diaphragm 46 to move stem 48 into engagement with valve member 60. Thus, no fuel vapor 14 will vent from fuel tank 16 to canister 28 through apparatus 10.

Another embodiment of a fuel tank venting control apparatus 110 in accordance with the present invention is illustrated in FIGS. 10–17. Reference numbers similar to those in FIGS. 1–9 refer to parts which perform the same or similar function as do the parts in FIGS. 10–17.

Figure 10:
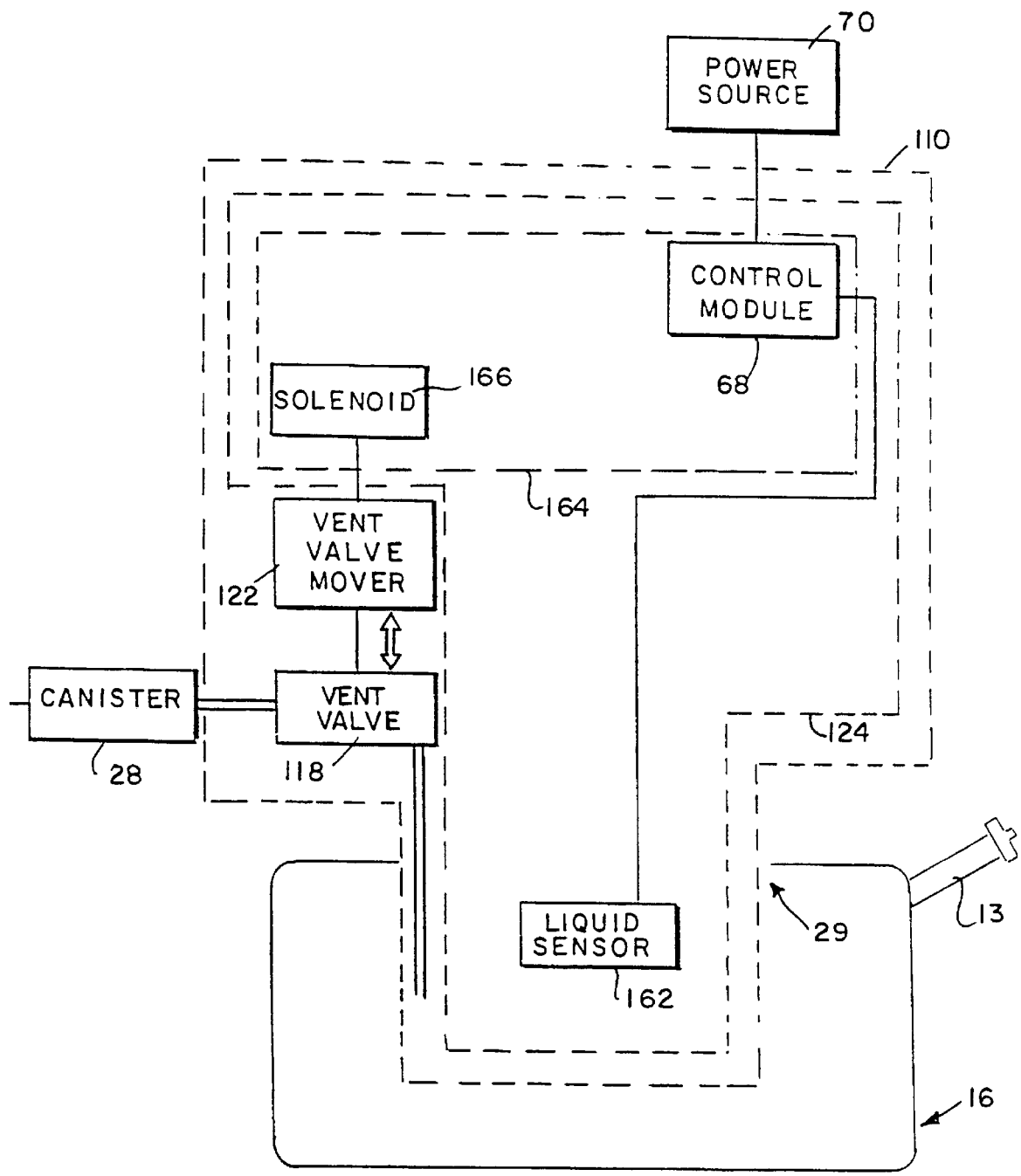
FIG. 10 is a diagrammatic view of a tank venting system in accordance with another embodiment of the present invention showing the fuel tank, a vent apparatus for controlling the discharge of fuel vapor and liquid fuel through the aperture formed in the top wall of the fuel tank, and the fuel vapor treatment canister coupled to the vent apparatus, the vent apparatus includes a vent valve, a vent valve mover, and a liquid fuel sensor positioned to lie in the fuel tank and configured to operate a control module and a solenoid to control operation of the vent valve mover so as to move the vent valve between the opened and closed positions.

A diagrammatic representation of fuel tank venting control apparatus 110 for a fuel system 112 in accordance with the present invention is provided in FIG. 10. Apparatus 110 controls venting of fuel vapor 14 from a fuel tank 16 by using a fuel vapor vent valve 118 and a valve actuator 120 including a valve mover 122 and an electronic liquid detector 124. Apparatus 110 facilitates tank venting by providing a flow path 126 through which fuel vapor 14 can escape from fuel tank 16 to a fuel vapor treatment canister 28. Vent valve 118 is positioned to close flow path 126 when retention of fuel vapor 14 in fuel tank 16 is desired and to oped flow path 126 when venting of fuel vapor 14 from fuel tank 16 is desired. The pressure of fuel vapor 14 and the positioning of liquid fuel 30 at a predetermined position in fuel tank 16 control the movement of vent valve 118 between opened and closed positions.

As shown in FIG. 10, tank venting control apparatus 110 is shown further including a housing 132 mounted in fuel tank 16 provided with a filler neck 33. Valve mover 122 includes a stem 136 coupled to vent valve 118 and a spring 138 positioned to bias vent valve 118 to the closed position.

Figure 11:
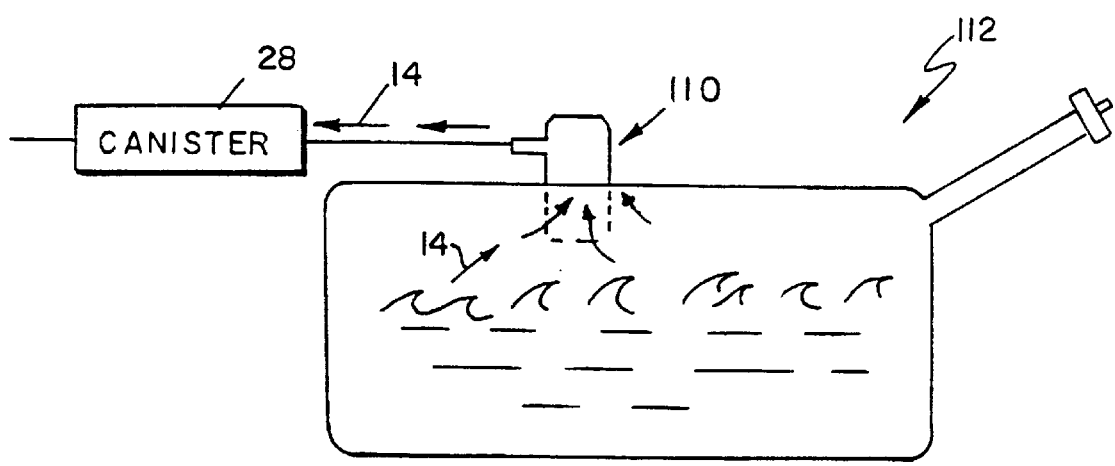
FIG. 11 is a diagrammatic view of the tank venting system of FIG. 10 showing fuel vapor flowing from the fuel tank through the vent apparatus to the canister during normal operation of the vehicle and sloshing of liquid fuel in the fuel tank.

In operation of apparatus 110 during operation of the vehicle (as shown in FIG. 11), vent valve 118 moves in response to decreasing liquid fuel levels to the opened position allowing fuel vapor 14 to flow from fuel tank 16 through flow path 126. From flow path 126, fuel vapor 14 can pass at a predetermined rate to canister 28 through a venting outlet 150 formed in housing 132.

Figure 13:
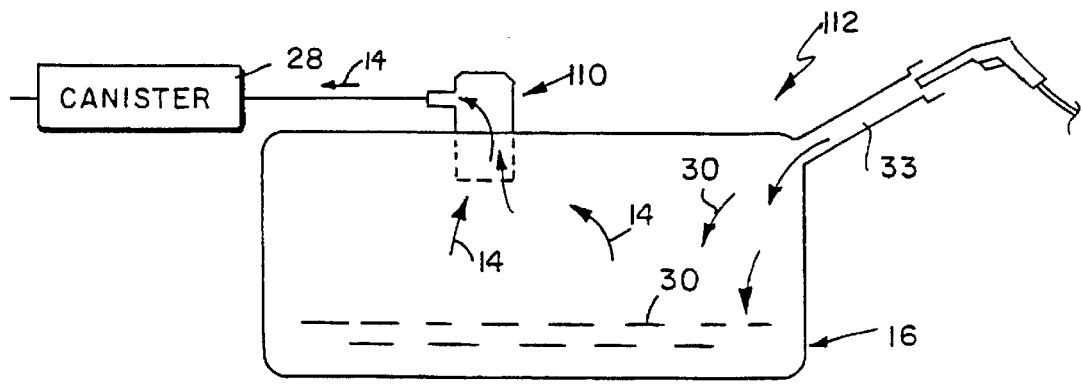
FIG. 13 is a diagrammatic view similar to FIG. 11 showing pressurized fuel vapor flowing from the fuel tank through the vent apparatus to the canister as liquid fuel is being pumped into the fuel tank during refueling.
Figure 14:
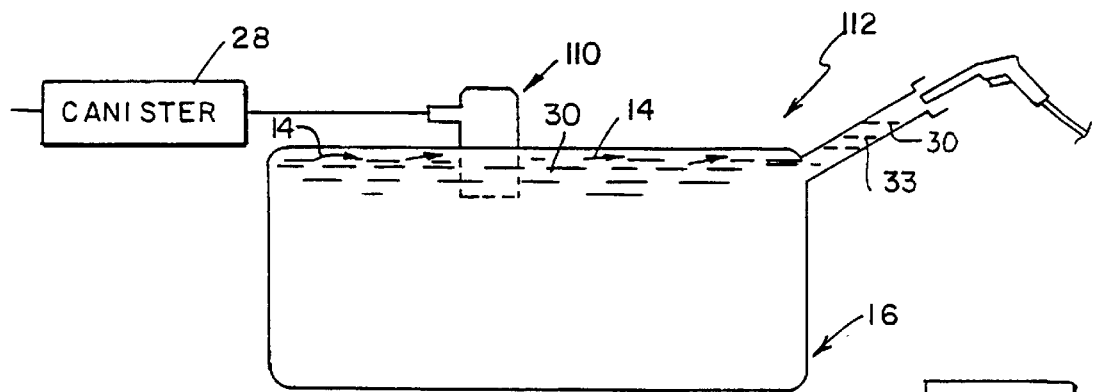
FIG. 14 is a diagrammatic view similar to FIG. 3 showing exposure of the vent apparatus to liquid fuel once the tank has been filled to a predetermined level during fuel vapor refueling and cessation of discharge of pressurized fuel vapor through the vent apparatus to the canister.
Figure 15:
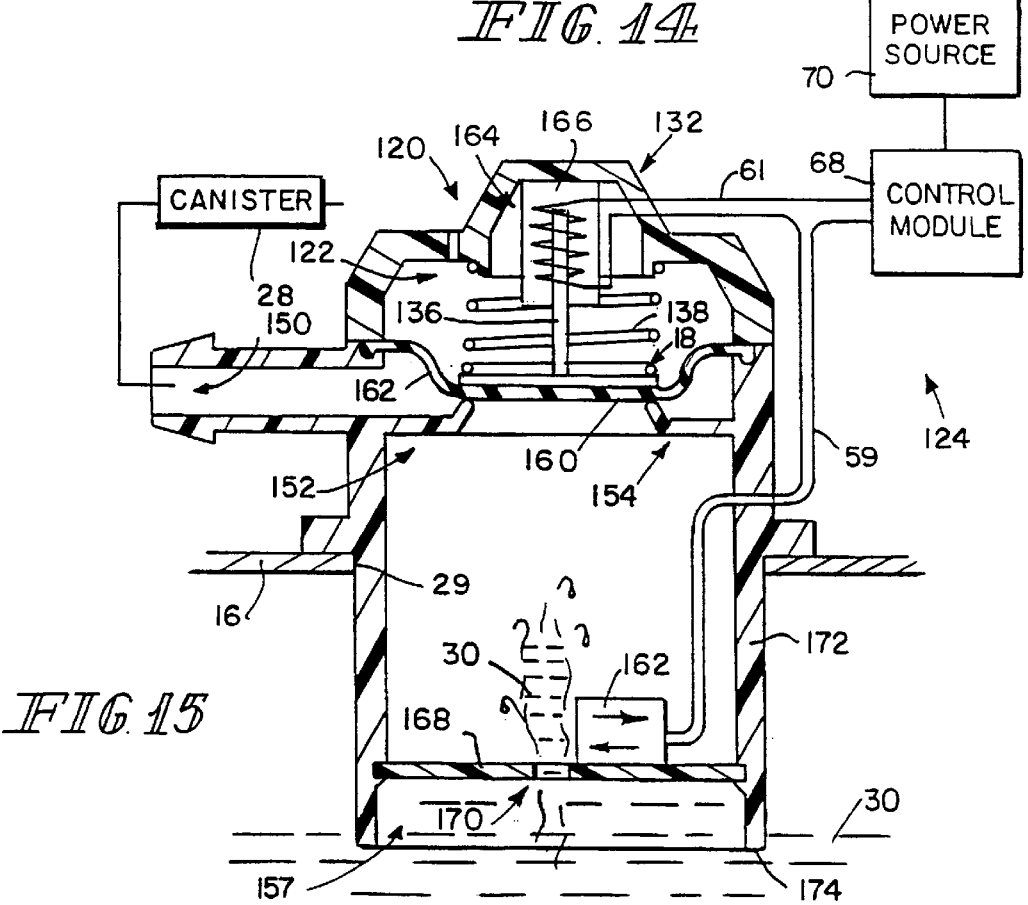
FIG. 15 is a view of the vent apparatus of FIG. 11 showing the vent valve of the vent apparatus in a closed position so that no fuel vapor or liquid fuel flows through the vent apparatus, the drive stem being in a deactivated position in response to the liquid sensor sensing liquid fuel at a predetermined position.

In operation of apparatus 110 during refueling of the vehicle (as shown in FIGS. 13 and 14), fuel vapor 14 is prevented from entering flow venting outlet 150 by vent valve 118, which moves to the closed position in response to the accumulation of liquid fuel 30 in fuel tank 16 at the predetermined position as shown in FIG. 15. With flow path 126 closed, vent valve 118 is moved to the closed position preventing fuel vapor 14 from flowing through flow path 126. Thus, fuel vapor 14 collects in fuel tank 16. As additional liquid fuel 30 is added to fuel tank 16, the pressure exerted by this collected fuel vapor 14 eventually becomes sufficient to displace liquid fuel 30 in reverse flow up filler neck 33 to actuate the shut-off mechanism provided on fuel filler nozzle 44 as shown in FIG. 14.

As shown in FIG. 11, housing 132 is formed to include a valve chamber 152 sized to receive vent valve 118 for movement therein, a valve seat 154 that cooperates with vent valve 118 to close flow path 126, and a spring mount 156 positioned to lie above valve seat 154, and an inlet 157 positioned to lie below valve seat 154. Spring 138 is positioned to lie between housing 132 and vent valve 118 to bias and move vent valve 118 against valve seat 154.

Vent valve 118 is provided with a valve member 160 and flexible hinge portions 162. Valve seat 154 is sized to engage valve member 160 in to seal therewith to close the flow of fuel vapor 14 from fuel tank 16 to venting outlet 150. Thus, fuel vapor 14 from fuel tank 16 entering valve chamber 152 by way of inlet 157 formed in housing 132 is prevented from entering venting outlet 150.

Figure 12:
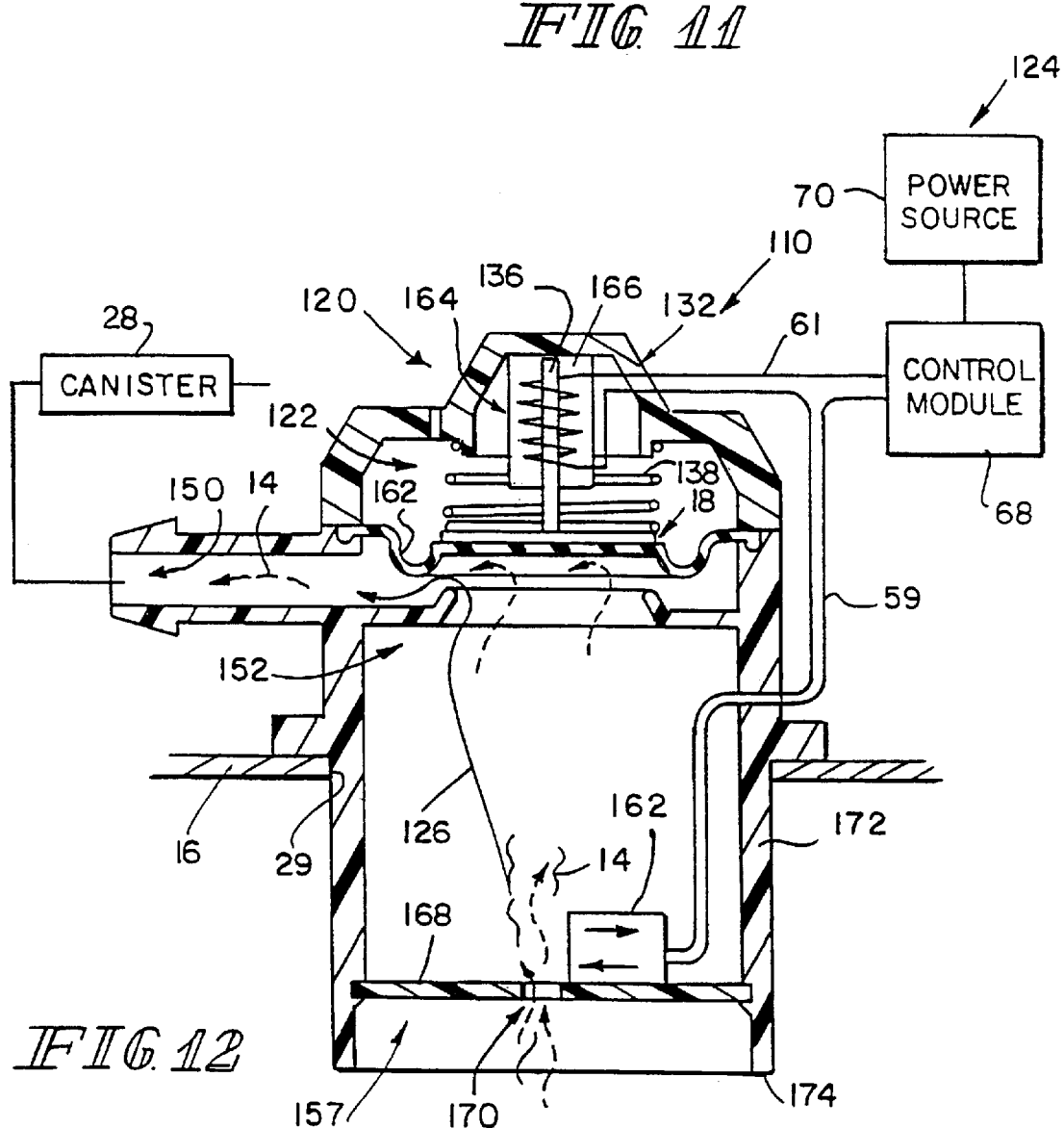
FIG. 12 is a side elevation view of the vent apparatus of FIG. 11, with portions broken away, showing a housing mounted in an aperture formed in the fuel tank, a vent valve, and a valve actuator coupled to the housing and arranged to move the vent valve to the opened position, the valve actuator including a liquid fuel sensor, an electronic actuator positioned to lie in the housing above the vent valve, and a drive stem coupled to the electronic actuator and the vent valve, the drive stem being in an activated position to move the vent valve to the opened position so that fuel vapor flows from the fuel tank through a venting outlet formed in the housing to the canister.

As shown in FIG. 10, electronic liquid detector 124 includes an electronic sensor 162 and a valve mover controller 164 including an electronic actuator or solenoid 166 and control module 68 coupled to power source 70. Housing 132 further includes a cylindrical wall 172 including a bottom lip 174 defining inlet 157 and a sensor support platform 168 formed to include an aperture 170. Electronic sensor 162 is coupled to sensor support platform 168 and positioned to lie adjacent aperture 170 as shown in FIG. 12.

Stem 136 is positioned to lie in solenoid 166. Stem 136 functions as a solenoid core and is moved by solenoid 166 between an activated position as shown in FIG. 12 to an deactivate position as shown in FIG. 15. Thus, valve member 160 opens flow path 126 while stem 136 is in the activated position and closes flow path 126 while stem 136 is in the deactivated position.

Electronic sensor 162 is positioned to lie at the predetermined position in fuel tank 16 to sense for the presence of liquid fuel 30. Upon sensing liquid fuel 30, electronic sensor 162 communicates the sensation to control module 68 by an electrical signal. Based on logical hardwired or programmed into control module 68, control module 68 deactivates solenoid 166 and stem 136 moves to the inactivated position to move vent valve 18 to the closed position and prevent the flow of fuel vapor 14 or liquid fuel 30 through flow path 126.

Figure 16:
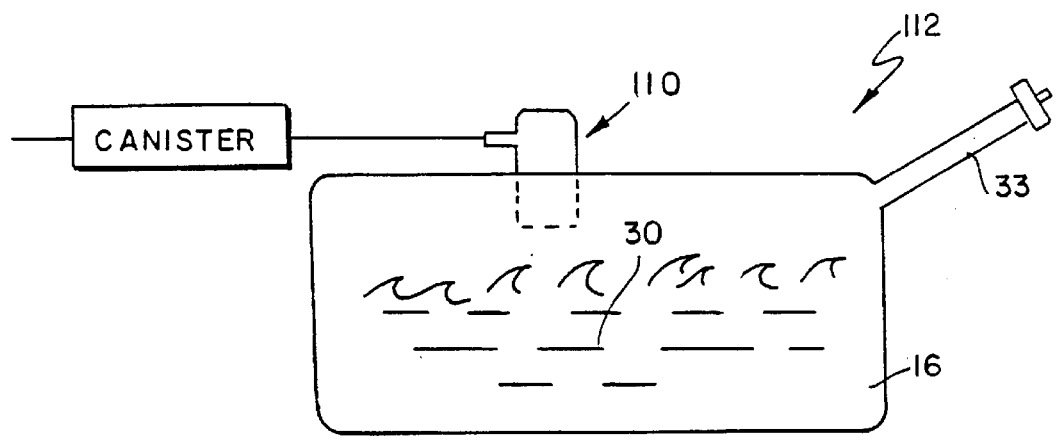
FIG. 16 is a diagrammatic view similar to FIG. 11 showing the tank venting system under a liquid fuel sloshing condition.
Figure 17:
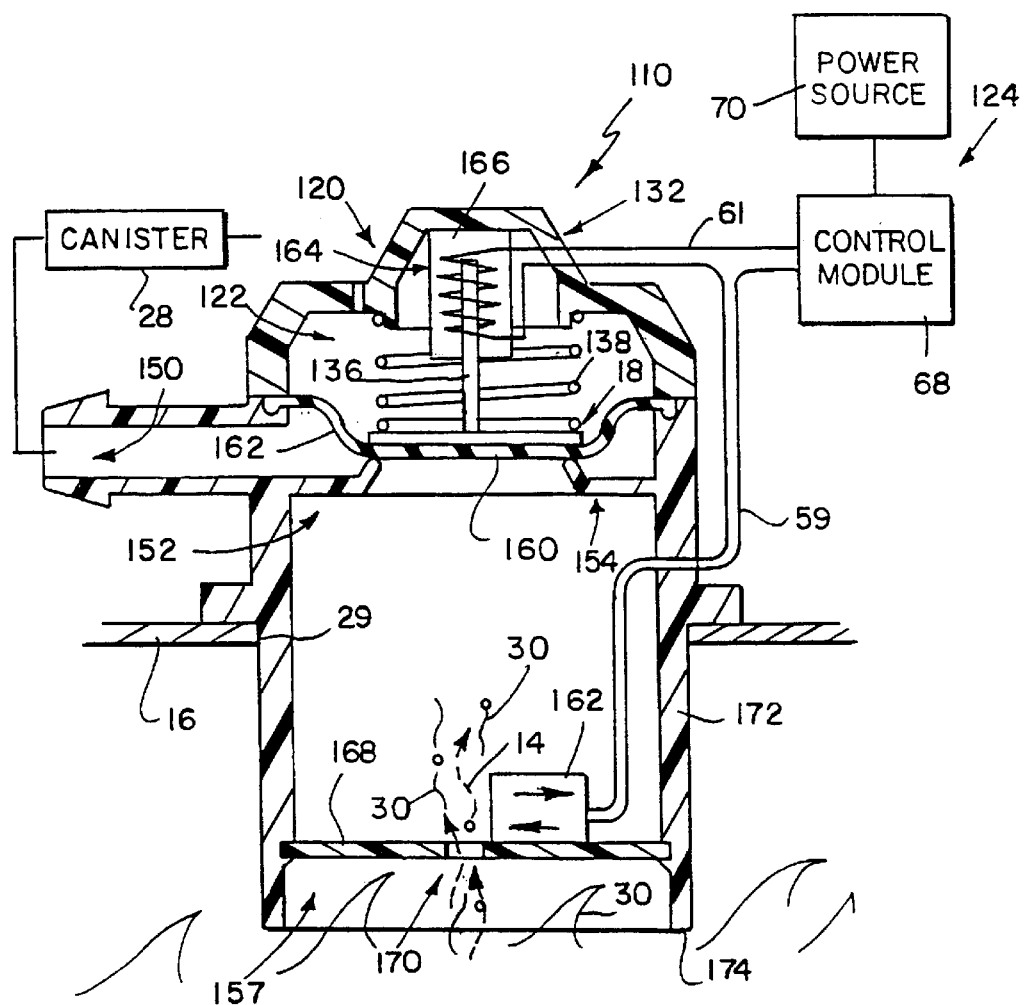
FIG. 17 is a cross-sectional view of the apparatus of FIG. 10 showing the stem being in the deactivated position to allow a biasing spring to move the vent valve to the closed position so that no liquid fuel or fuel vapor flows from the fuel tank to the canister through the venting outlet of the housing.

Electronic sensor 162 will detect liquid fuel 30 at the predetermined position in fuel tank 16 when liquid fuel 30 enters cylindrical wall aperture 170 as shown in FIG. 15. Liquid fuel 30 will enter aperture 170 during refueling and when liquid fuel 30 sloshes in fuel tank 16 during vehicle operation as shown in FIGS. 16 and 17. Thus, upon detection of liquid fuel 30 at the predetermined position, electronic liquid detector 124 instructs valve mover 122 to quickly close vent valve 118. This closure preserves the desired level of fuel vapor 14 in fuel tank 16 during refueling and prevents liquid fuel from entering venting outlet 150 during sloshing.

Control module 68 can also be hardwired or programmed to include a duty cycle and solenoid 166 is a servo solenoid. This configuration will allow control module 68 to instruct the opening of vent valve 118 gradually. For example, after spring 138 has moved vent valve to the closed position, control module 68 may instruct solenoid 166 to open at slow rate. By opening vent valve 118 at a gradual rate, the calibration of the engine can be eased because the flow is gradually reintroduced that in turn improves the ability of the engine to decide how much fuel it can burn.

Sensor 62 of apparatus 10 is a capacitance sensor that senses the capacitance of matter (e.g., rising liquid fuel and fuel droplets) at the predetermined position. Thus, when sensor 62 senses the capacitance of liquid fuel 30 at the predetermined position, it communicates this sensation to control module 68. Sensor 162 of apparatus 110 is a passive infrared optical sensor that senses an optical characteristic of matter (e.g., rising liquid fuel and fuel droplets) at the predetermined position. Thus, when sensor 162 senses an optical characteristic of liquid fuel 30 at the predetermined position, it communicates this sensation to control module 68. Sensors 62, 162 are coupled to control module 62 by a pair of leads 59. Likewise, solenoids 66, 166 are coupled to control module 62 by a pair of leads 61.

U.S. Provisional application Serial No. 60/060,662, filed Oct. 2, 1997, and entitled ELECTRONIC FILL-LIMIT CONTROL, is hereby incorporated by reference.

Although the invention has been described in detail with reference to certain preferred embodiments, variations and modifications exist within the scope and spirit of the invention as described and defined in the following claims.

What is claimed is:

1. An apparatus for controlling the discharge of fuel vapor and liquid fuel through an aperture formed in a fuel tank, the apparatus comprising a housing adapted to be mounted in an aperture formed in a fuel tank, the housing being formed to include a venting outlet, a valve positioned to lie in the housing and move between an opened position allowing flow of fuel vapor through the venting outlet formed in the housing and a closed position preventing flow of fuel vapor and liquid fuel through the venting outlet, and a valve actuator including a fluid actuator valve mover and an electronic liquid detector coupled to the valve mover, the valve mover being positioned to lie in the housing and arranged to move the valve between the closed position and the opened position, the electronic liquid detector including a valve mover controller coupled to the valve mover to control fluid at said fluid actuated valve mover and an electronic liquid sensor coupled to the valve mover controller and positioned to lie in a fixed position relative to the housing to sense the presence of liquid fuel at a predetermined position, the valve mover controller being configured to instruct the valve mover to move the valve to the closed position in response to sensing of liquid fuel at the predetermined position by the electronic liquid sensor.

2. The apparatus of claim 1, wherein the housing is formed to include a valve seat, the valve mover includes a spring and an electronic actuator, the spring biases the valve to move the valve to the closed position, and the electronic actuator moves the valve to the opened position when the electronic liquid sensor senses the absence of liquid fuel at the predetermined position in the housing.

3. The apparatus of claim 2, wherein the valve includes a valve member and a stem coupled to the valve member.

4. The apparatus of claim 1, wherein the electronic sensor is a capacitance sensor that senses the capacitance of matter at the predetermined position.

5. The apparatus of claim 1, wherein the electronic sensor is an optical sensor that senses an optical characteristic of matter at the predetermined position.

6. The apparatus of claim 5, wherein the optical sensor is a passive infrared detector.

7. The apparatus of claim 1, wherein the housing is formed to include a wall that extends into the fuel tank through the aperture formed in the fuel tank and the electronic sensor is coupled to the wall.

8. The apparatus of claim 1, wherein the valve mover controller includes a control module that records the number of changes of position of the valve and limits the changes in position of the valve to a predetermined number.

9. The apparatus of claim 1, wherein the valve mover controller includes a control module configured to record emissions data and communicate with the valve mover when the emissions data reach a predetermined level and the valve mover moves the valve to change the position of the valve in response to the communication from the control module.

10. The apparatus of claim 1, wherein the valve mover controller includes a control module configured to record the orientation of a vehicle in reference to the ground and communicate with the valve mover when the orientation of the vehicle reaches a predetermined value and the valve mover moves the valve to change the position of the valve in response to the communication from the control module.

11. An apparatus for controlling the discharge of fuel vapor and liquid fuel through an aperture formed in a fuel tank the apparatus comprising:
a housing adapted to be mounted in an aperture formed in a fuel tank, the housing being formed to include a venting outlet,
a valve positioned to lie in the housing and move between an opened position allowing flow of fuel vapor through the venting outlet formed in the housing and a closed position preventing flow of fuel vapor and liquid fuel through the venting outlet,
a valve actuator including a valve mover and an electronic liquid detector coupled to the valve mover, the valve mover being positioned to lie in the housing and arranged to move the valve between the closed position and the opened position, the electronic liquid detector including a valve mover controller coupled to the valve mover and an electronic liquid sensor coupled to the valve mover controller and positioned to lie in a fixed position relative to the housing to sense the presence of liquid fuel at a predetermined position, the valve mover controller being configured to instruct the valve mover to move the valve to the closed position in response to sensing of liquid fuel at the predetermined position by the electronic liquid sensor, and
wherein the valve mover includes a diaphragm, a drive stem depending from the diaphragm, and a passage formed in the housing, the diaphragm and the housing cooperate to define a venting control chamber, the passage being configured to conduct fuel vapor from the fuel tank to the venting control chamber to move the diaphragm to move the drive stem into engagement with the valve and move the valve to the opened position.

12. The apparatus of claim 11, wherein the valve mover controller includes a shut-off valve positioned to lie in the passage for movement between an opened position allowing pressurized fuel vapor to pass from the fuel tank into the venting control chamber and a closed position blocking passage of pressurized fuel vapor from the fuel tank into the venting control chamber and a control module coupled to the shut-off valve and the electronic liquid sensor, the control module receives sensations from the electronic sensor, and the shut-off valve closes the passage formed in the housing in response to the control module when the electronic control senses the presence of liquid fuel at the predetermined location.

13. The apparatus of claim 12, wherein the valve mover further includes a bleed passage formed in the housing between the venting control chamber and the venting outlet, when the shut-off valve closes the passage, pressurized fuel vapor flows from the venting control chamber to the venting outlet to move the diaphragm away from the valve member to move the stem out of engagement with the valve member and the valve member moves to the closed position.

14. The apparatus of claim 12, wherein the valve mover controller further includes a solenoid and a stem-shaped core positioned to lie in the solenoid, the shut-off valve includes a valve member coupled to the core, and the solenoid moves between an activated position when the electronic liquid sensor detects the absence of liquid fuel at the predetermined position and a deactivated position when the electronic sensor detects liquid fuel at the predetermined position, the solenoid biases the core and valve member while in the activated position to move the valve to the opened position.

15. The apparatus of claim 14, wherein the valve mover further includes a spring positioned to lie between the core and the housing to bias the core and valve member of the shut-off valve to the closed position when the solenoid is in the inactivate position.

16. The apparatus of claim 12, wherein the control module records the number of changes of position of the shut-off valve and limits the changes in position of the shut-off valve to a predetermined number.

17. A tank venting system comprising
a housing adapted to be mounted in an aperture formed in a fuel tank, the housing being formed to include a venting outlet,
a vent valve positioned to lie in the housing for movement between an opened position allowing flow of fuel vapor through the venting outlet and a closed position blocking flow of fuel vapor through the venting outlet, a fluid actuated valve mover for moving the vent valve between the opened and closed positions, an electronic liquid sensor positioned to lie in a fixed position relative to the housing to communicate with liquid fuel admitted therein, and wherein said sensor controls fluid pressure at the fluid actuated valve mover to cause the fluid actuated valve mover to position the vent valve between an open and closed position.

18. The system of claim 17, wherein the valve mover includes a diaphragm cooperating with the housing to define a venting control chamber and a bypass passage conducting pressurized fuel vapor to the venting control chamber and the electronic valve mover controller includes a shut-off valve movable between an opened position allowing flow of fuel vapor through the bypass passage to the venting control chamber and a closed position blocking flow of fuel vapor through the bypass passage to the venting control chamber, a solenoid coupled to the shut-off valve, and control means for actuating the solenoid in response to a signal generated by the electronic liquid sensor indicating presence of liquid fuel in the housing to cause the shut-off valve to move in the bypass passage to the closed position of the shut-off valve.

19. The system of claim 18, wherein the valve mover further includes spring means for normally biasing the vent valve to the closed position of the vent valve and a drive stem appended to the diaphragm and positioned to move the vent valve against the spring means upon exposure of the diaphragm to fuel vapor pressure extant in the venting control chamber in excess of a predetermined pressure level.

20. The system of claim 17, wherein the electronic liquid sensor is a capacitance sensor.

21. The system of claim 17, wherein the electronic liquid sensor is an optical sensor.

* * * * *